Sept. 6, 1932.  C. W. KIRSCH  1,876,061
DRAPERY SUSPENSION DEVICE
Filed June 22, 1931  4 Sheets-Sheet 1
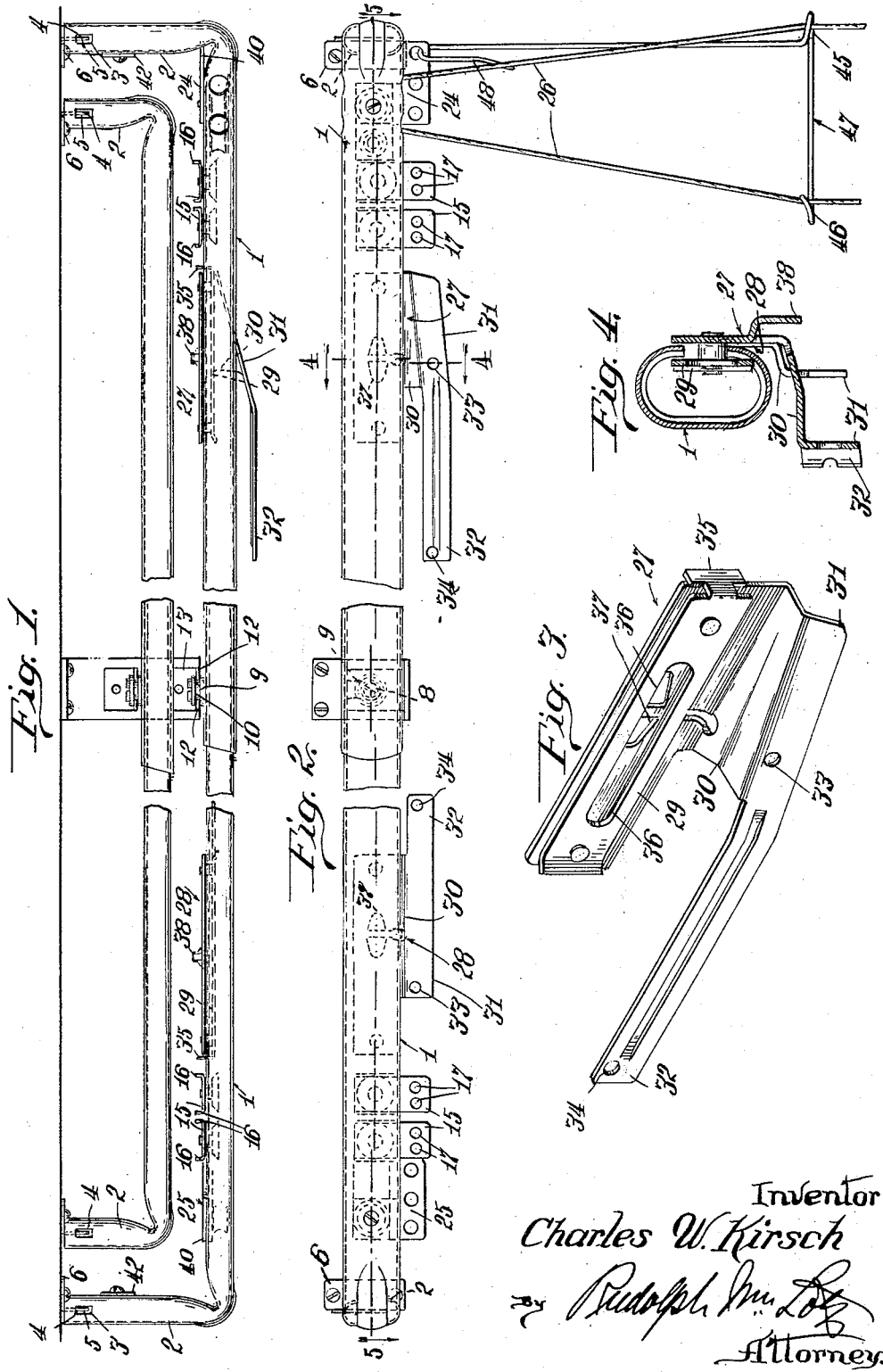

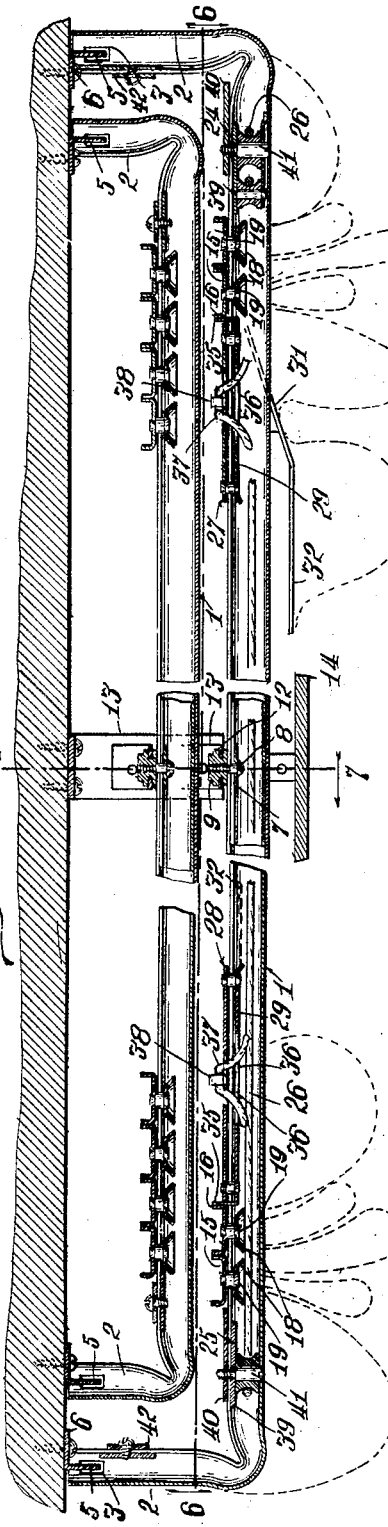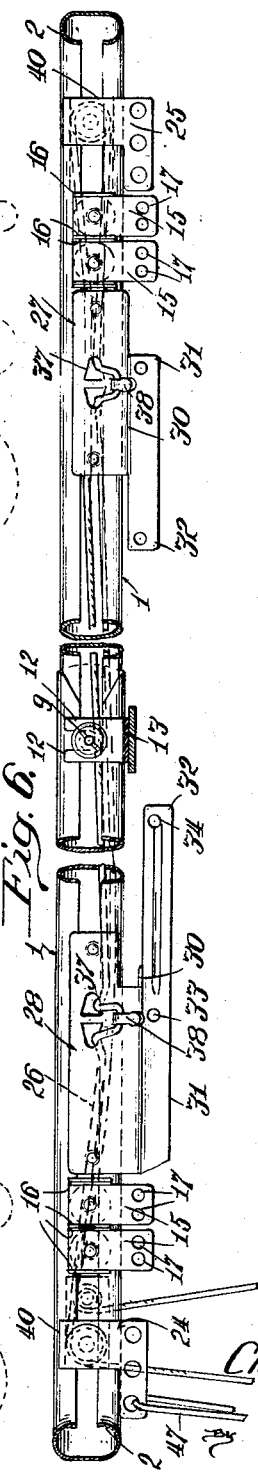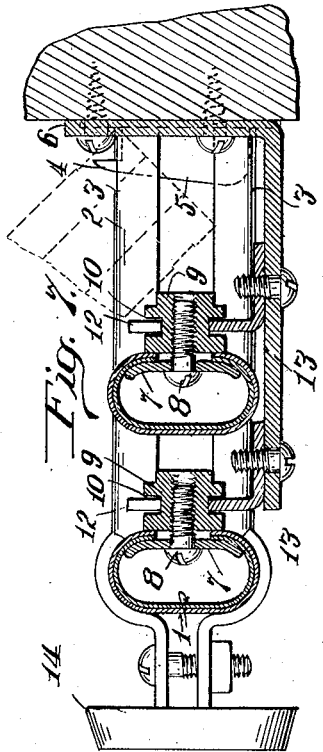

Sept. 6, 1932.  C. W. KIRSCH  1,876,061
DRAPERY SUSPENSION DEVICE
Filed June 22, 1931   4 Sheets-Sheet 3
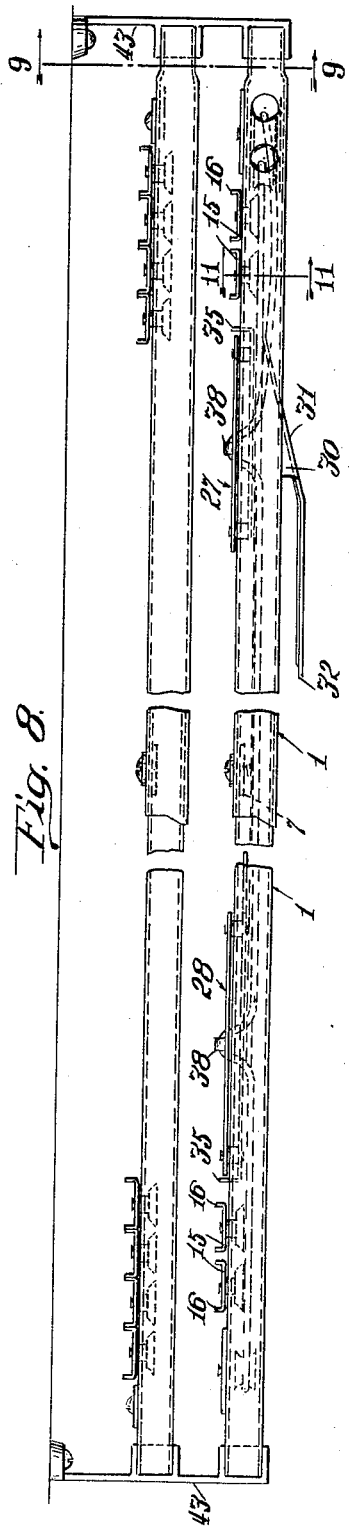
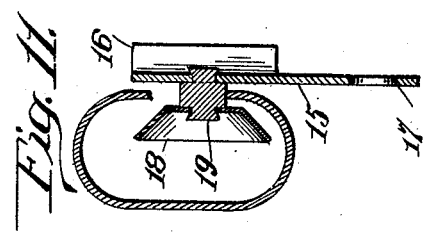
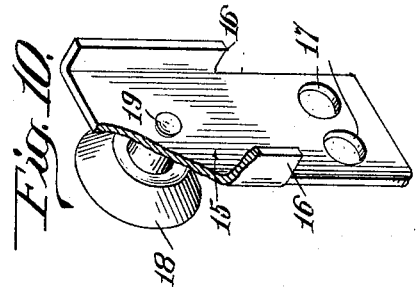
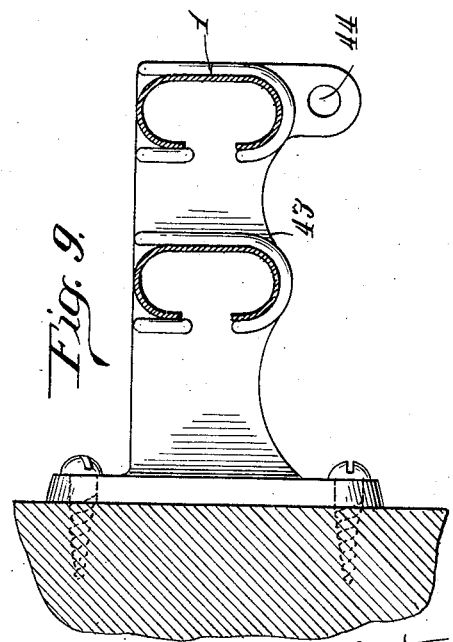
Inventor
Charles W. Kirsch
By Rudolph M. Loy
Attorney.

Sept. 6, 1932. C. W. KIRSCH 1,876,061
DRAPERY SUSPENSION DEVICE
Filed June 22, 1931 4 Sheets-Sheet 4
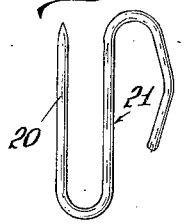
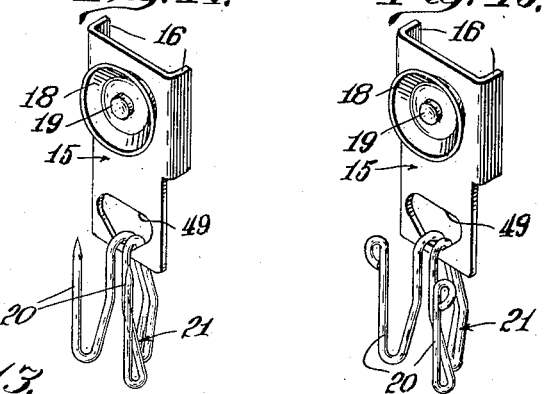
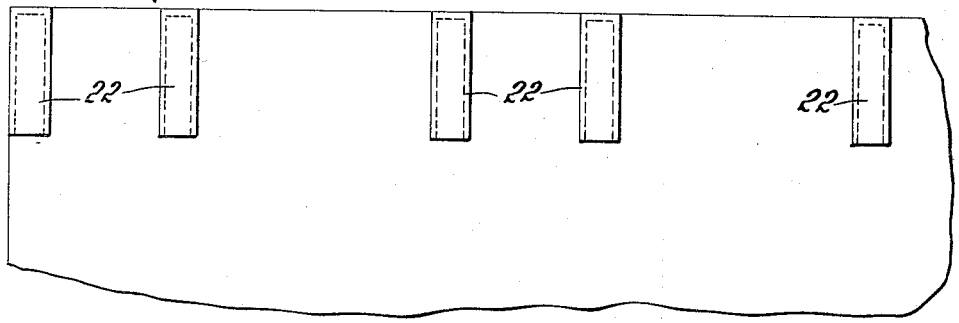
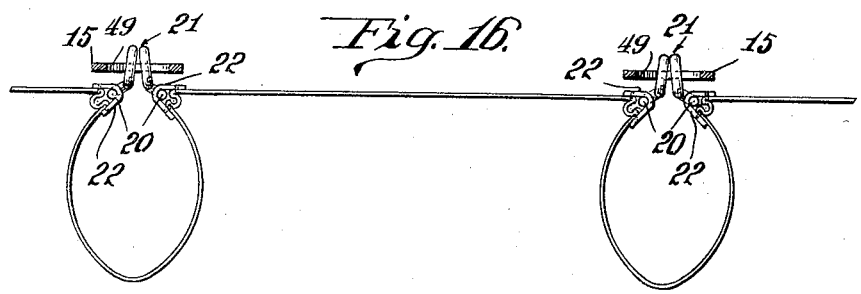
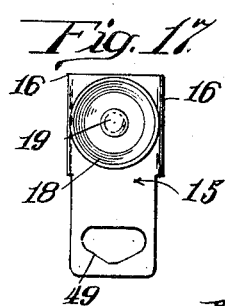
Inventor
Charles W. Kirsch
By Rudolph M. Lotz
Attorney.

Patented Sept. 6, 1932

1,876,061

UNITED STATES PATENT OFFICE

CHARLES W. KIRSCH, OF STURGIS, MICHIGAN, ASSIGNOR TO KIRSCH COMPANY, OF STURGIS, MICHIGAN, A CORPORATION OF MICHIGAN

DRAPERY SUSPENSION DEVICE

Application filed June 22, 1931. Serial No. 546,134.

This invention has for its general object to provide a drapery supporting fixture of the type known as "traverse tracks" comprising one or more rods equipped with so-called traverse slides from which the curtains or draperies are suspended and with sheaves and draw-cords, by means of which the curtains or draperies may be drawn apart and together, and which is further and otherwise equipped with devices co-operating with each other and the said slides and cords, etc. to provide a complete structure possessing the several distinct advantages hereinafter more particularly pointed out.

The invention has for its more particular object to provide a curtain fixture of the above mentioned type which includes a telescopically extensible curtain rod or rods as well as a single piece or non-extensible rod or rods, and wherein the several component elements coact with each other to produce a desirable result, with due regard to interchangeability of parts as applied to either the extensible and non-extensible rods, respectively.

The invention is fully illustrated in the accompanying drawings, wherein:

Fig. 1 is a top plan view of a curtain fixture constructed in accordance with the invention.

Fig. 2 is a front elevation of the same.

Fig. 3 is a perspective view of a so-called master drapery carrier of the structure.

Fig. 4 is a detail vertical transverse section taken on the line 4—4 of Fig. 2.

Fig. 5 is a plan section of a curtain rod taken on the line 5—5 of Fig. 2.

Fig. 6 is a vertical sectional view of the same on the line 6—6 of Fig. 5, one of the two rods of Fig. 1 being omitted.

Fig. 7 is a vertical sectional view of the same, on an enlarged scale, on the line 7—7 of Fig. 5.

Fig. 8 is a plan view of a modified form of an extensible type of curtain fixture constructed in accordance with the invention.

Fig. 9 is a vertical transverse sectional view of the same, on an enlarged scale, on the line 9—9 of Fig. 8.

Fig. 10 is a perspective view, on an enlarged scale, of one of the drapery carriers constituting parts of the fixtures shown in Figs. 1, 2, 3, 5, 6, and 8.

Fig. 11 is a vertical sectional view, on an enlarged scale, on the line 11—11 of Fig. 8.

Fig. 12 is a side elevation of a drapery suspension hook equipped with a pin-shank.

Fig. 13 is a view in elevation of the upper edge portion of a curtain equipped with fabric pockets for engaging suspension hooks therewith.

Figs. 14 and 15 are perspective views showing two forms of drapery suspension hooks, each having two shanks, the shanks of one of which has points for engaging the drapery, and the shanks of the other of which have loops to engage in the fabric pockets of the drapery shown in Fig. 13.

Fig. 16 is a plan view showing the upper edge of a drapery and a carrier therefor showing pinch pleats formed in the drapery.

Fig. 17 shows a modified form of drapery carrier.

The curtain fixture of the present invention comprises one or more curtain rods made of sheet metal, and are substantially C-shaped in cross-section, so that the face of the rod which is opposed to the window casing presents a continuous longitudinal slot which is bordered by flanges which constitute the rear wall of the rod.

Rods of this type are very well-known in the art and are made in two types, one thereof consisting of two telescopically interfitting members as shown in Figs. 1, 2, 5, 6, and 8, and the other being composed of a single straight rod commonly known as the "cut-to-fit" type, which are not shown.

The telescopically extensible type of rod is generally provided at its ends with arms which engage the supporting brackets which are mounted on the window casing (shown in Figs. 1, 2, 5, 6, and 7) but are also made in straight pieces devoid of said arms and are supported at their ends in brackets equipped with sockets to receive the same, the brackets of the type shown in Figs. 8 and 9 being suitable for both the non-extensible and the extensible straight rods, respectively.

The said respective rods and the supporting brackets therefor do not, per se, constitute the present invention which consists of a combination of co-operating elements which include any one of the aforesaid several types of rods and the supporting brackets therefor, the present invention, except as hereinafter specifically pointed out, including any of the various types of said supporting brackets commonly used in this art.

One of the essential objects of the present invention is to provide traverse devices which may be used with equal advantage on either the extensible or non-extensible types of rods and which are so constructed and proportioned as to size relatively to internal cross-sectional dimensions of the rod as to leave ample room in the latter for the drawcords so that the relative dimensions of the rods and the parts projecting into or contained within the same constitute specific co-acting means within the scope of the invention.

With respect to Figs. 1 to 7, inclusive, the rods 1 therein illustrated are of the telescopically extensible type, each of the two component parts of each rod being provided at one end with an arm 2. The latter are provided adjacent their ends with perforations 3 in both top and bottom walls, the perforation in the wall of each arm receiving the projection 4 of the bracket arm 5 of a wall plate 6. The said perforations are spaced from the ends of the arms 2 a distance equal to the space between the wall plate 6 and the opposed face of the projection 4 so that, as is shown in dotted lines in Fig. 7, the rods are engaged with the brackets by first causing the extremities of the top walls of the arms to rest in the corners formed at the junctions of the upper edges of the bracket arms 5 with the wall plates 6, while the arms 2 are disposed at an upward incline. The arms 2 are then swung downwardly on the fulcrum axis presented by the extremity of the top walls of the arms to the full-line position of Fig. 7, whereupon the entire extremity of each arm 2 bears upon the wall plate 6 and thus each of said arms becomes horizontally disposed.

Fig. 1 shows two telescopically extensible curtain rods, commonly termed "tandem" rods, the side arms 2 of which are of different lengths, such an arrangement of a plurality of rods being common in the art.

The substantially pivotal movement of the arms 2 to throw the same into engagement with their supporting fixtures is common to certain other types of brackets and is a feature which is important in connection with a center bracket and engaging means therefor shown in Fig. 7.

Where the window casing to be spanned by a rod 1 is exceptionally wide or where a rod 1 is of a length to span a group of closely spaced window casings, the said rod 1 will sag under the weight of the curtains or draperies and, therefore, requires additional support between its ends. In such instances, a device known as a "center-bracket" or "center support" is used, and in Fig. 7 is illustrated a novel and very advantageous device of this character, together with devices clamped upon the flanges of the rod 1 for locking the component sections of the rod against relative movement and also engaging the same with the said center support or bracket, the said clamping devices also performing a further important function as is hereinafter pointed out.

The telescopically interengaged portions of the component parts of the rod 1 overlap each other midway between the ends of the rod which is adjusted to proper length after the supporting brackets have been mounted on the window casing. It is desirable then to secure these component parts against relative movement and to this end a plate 7 is mounted within the rod midway between its ends. This plate is provided with a perforation through which the shank of a machine screw 8 is passed. This shank receives a nut 9 which cooperates with the plate 7 to clamp the flanges of the component parts of the rod so firmly against each other as to prevent their relative movement. The nut 9 is provided between its ends with an annular groove 10 which is of a width slightly greater than the thickness of the arm 12 of the bracket 13 which is secured to the window casing midway between the supporting brackets for the ends of the rod. The arm 12 is bifurcated to be received in the groove 10 of the nut 9 which rests in the bottom of the recess of said arm 12. It will be noted that the arm 12 is thus hidden behind the rod 1 and that the bracket 13 is substantially invisible, which is very desirable. Furthermore the said arm 12 is so positioned that it permits a center ornament 14 to be secured to the front rod 1 in alignment with the bracket 13 without interfering with the latter.

Where a plurality of rods are disposed in tandem relation, as in Fig. 1, the center support or bracket 13 is equipped with a number of bifurcated arms corresponding with the number of tandem rods used.

The above described pivotal movement of the arms 2 of the rod 1 in engaging the same with the supporting brackets for the ends of the rod, will also cause the groove 10 of the nut 9 to receive the arm 12 of the bracket 13 and will cause said nut to rest in the bottom of the recess in said arm 12.

The rod 1 is further equipped with the drapery suspension devices or carriers 15, shown in Figs. 10 and 11, which are commonly termed "transverse slides". Each of said devices 15 consists of a flat plate of sheet metal which is provided along the upper portions of its side edges with flanges 16 and, in its lower end portion, with a pair of perforations 17, or their equivalent (as hereinafter more particularly described). Each of said plates is equipped adjacent its upper end, and on the face thereof opposite that from which the flanges 16 project, with a cup 18 which is permanently secured to said plate by means of a rivet 19, the middle portion of which constitutes a spacing element which rides upon the lower flange of the rod and is freely rotatable thereon without being rotatable relatively to the member or plate 15. The cup 18 is relatively shallow compared to the width of space between the front wall of the rod 1 and the flanges or rear wall thereof, thus providing ample room within the rod for the draw-cords to be used as hereinafter described. The side flanges 16 of said plates serves to prevent the latter from becoming overlapped or "nested" and thus preventing free manipulation of the same to separate the drapes and to draw them together.

A given number of the members 15 are mounted at each side of the plate 7, this number varying with the length of the rod 1 and sometimes also with the weight of the draperies used. In many instances, the said draperies are equipped with pinch-pleats (also termed "Spanish pleats") which are customarily formed by stitching parts of the upper edge portion of the curtain or drapery together to produce what may be termed a "fluted" effect. The necessity for laundering or cleaning the curtains or draperies renders it very desirable that such stitching be avoided and that the stitching thereto of metallic devices such as suspension hooks also be avoided because these must be detached before laundering or cleaning of the fabric is undertaken and, in the case of stitched pleats, the stitching must be removed.

The present invention contemplates a very simple and efficient detachable means for forming the said pleats and at the same time providing suspension devices for the draperies.

This may be accomplished by inserting into the upper edge portions of the draperies at necessary points the pin shanks 20 of suspension hooks 21 disposed in pairs and each pair of which is engaged in the pair of perforations 17 of a member 15, thus to form the said pinch-pleats and, at the same time, provide suspension devices which are easily detachable from both the drapery and the said members 15 (see Figs. 13 to 16).

The same result is also attained by permanently stitching vertically disposed pieces of tape 22 to the upper edge portions of the draperies, as shown in Figs. 13 and 16, to form inverted narrow pockets which receive the looped end portions of the arms 23 of the suspension hooks.

The members 15, hereinafter referred to as carriers, may be caused to move back and forth by manually manipulating the draperies suspended therefrom instead of by draw-cords, if desired. If draw-cords are to be used, the rod 1 is equipped adjacent its ends or adjacent its elbows with sheave carriers 24 and 25 which are mounted within the rod 1. The rod 1 is provided with perforations in its bottom wall with which the two sheaves of the carrier 24 are aligned so that the ends of the draw-cord 26 may project through said perforation.

In connection with the draw-cord 26, it is necessary to employ a pair of carriers 27 and 28 which are commonly termed "leaders" and are herein referred to as "master" carriers, to which the draw-cord is attached at points between its ends.

Each of the carriers 27 and 28 includes a main outer plate and an inner plate 29 which is parallel with the main portion of the outer plate and is secured thereto by means of rivets which include spacing means. The latter ride upon the lower flange of the rod 1. The outer plate is opposed to the rear wall of the rod 1, the said bent portion 30 being provided with the flange 31 terminating in a finger 32, the said flange being provided with a slot 33 and the finger being provided with a perforation 34. The said inner plate 29 and the said rivets cooperate with the flange of the rod to guide the said devices and prevent their detachment and may obviously be replaced by any other suitable means for accomplishing this purpose.

The bent portions 30 of the respective carriers 27 and 28 are of different width, respectively, so that the respective fingers 32 thereof will overlap each other when said carriers are disposed in contact with the plate 7. The front upper corners of the draperies are attached to the forward ends of the fingers 32 and are thus caused to overlap each other to shut out the light completely.

The main plate of each carrier 27 and 28 is provided on its rear edge with a flange 35 against which a side edge flange of the next adjacent member 15 abuts when the draperies are separated to admit light.

The inner plate 29 of each carrier 27 and 28 is provided with a slot 36 while the main plate of each is provided with a pair of openings 37 which are spaced from each other by a bridge member 37ª, and a hook 38 bordering the upper edge of said openings. The draw-cord 26 is threaded through the slot 36, then through an opening 37, over the bridge member 37ª, then through the other opening 37 and again through the slot 36 so that a loop of said cord engages the bridge member 37ª to attach the carrier permanently to the draw-cord which may easily slip to permit travel of the carrier on the rod for purposes of adjustment as hereinafter described. After said adjustment, this loop is drawn over the hook 38 which prevents the draw-cord from slipping relatively to the carrier.

The draw-cord is not attached to the members 15. The draw-cord presents two strands extending between the respective sheave carriers. One of these strands is attached to the carrier 27 and the other to the carrier 28 and they necessarily move the members 27 and 28 simultaneously in opposite directions.

In assembling the extensible rod, the sheave carriers and draw-cord are first put in place. Then the desired number of carriers 15 are inserted into each of the component sections of the rod.

The carriers 27 and 28 are attached to the draw-cord during the first assembly step without, however, engaging the draw-cord with the hooks 38 of said carriers which may now freely move along the cord.

After the carriers 15 have been inserted, the carriers 27 and 28 are inserted into the respective rod sections, then the middle clamping device is mounted in one of said sections and said sections then telescopically associated with each other and adjusted to provide a rod of desired length or span. The said middle clamping device is then moved to position midway between the ends of the rod and there secured.

The rod may now be manually supported at an elevation, the draw-cord ends drawn taut and so held while the carriers 27 and 28 are moved to engage the said middle clamping device and, when so positioned, the aforesaid loops of the draw-cord which rest upon the bridge members 37ª are then digitally drawn over the hooks 38 whereupon the rod is mounted on its brackets in operative condition.

It will be understood, of course, that the carriers 27 and 28 may be used without the draw-cord and the sheave carriers, if desired.

The telescopically extensible rods present shoulders at the inner extremities of the component parts thereof which tend to interfere with the smooth operation of the drapery carriers. The carriers 15, 28, and 27 are designed and constructed to operate smoothly on the extensible rods, the carriers 15 being rendered freely rotatable relatively to the rod so that they may respond to pull on the upper edges of the draperies without binding or otherwise unduly resisting travel.

Each sheave carrier 24 and 25, as shown in Fig. 5, includes an inner plate 39 having a smooth perforation therein for each sheave; an outer plate 40 having a threaded opening for each sheave; a set screw 41 having a large diameter smooth shank portion upon which a sheave is rotatable; and a small diameter threaded end portion which passes through the perforation in the plate 39 and engages in the threaded opening of the plate 40 to clamp said plates against the flanges of the rod 1, the latter being provided with properly positioned openings in its front wall through which the screws 41 are passed. The sheaves are confined between the plates 39 and the front wall of the rod 1.

The other plates 40 project below the lower edge of the rod 1 and are provided with perforations to which the rear upper corner portions of the draperies are suitably attached as heretofore described with respect to the carriers 15. In the event that it is desired to shut out side light, the rear edge portions of the draperies are extended laterally and have their rear upper corner portions attached as aforesaid to the plates 42 secured to the side arms of the rod 1.

In the case of straight rods, the ends of which are disposed in sockets in the opposed side faces of the brackets 43, the latter are provided with loops 44 to which the upper rear corners of the draperies are attached.

The brackets 43 being identical with each other, it is necessary that, in the case of extensible rods, the outer rod member be shrunk at its outer extremity to accord with the outer dimensions of the inner rod member, this being done in the factory.

In each instance, the plate 7 constitutes a guide and stop formation for the carriers 15 when used without the carriers 27 and 28, and for the latter when used.

In all instances where the draw-cord 26 is used, the end portions of the latter are passed through the loops 45 and 46 of the draw-cord separator 47, as shown in Fig. 2. This comprises a substantially L-shaped wire device equipped at one end with a hook 48 to engage in a perforation of a plate 40 or 42 or to the loop 44 of the bracket 43. The loops 45 and 46 are helical, one being disposed at the elbow and the other at an extremity of the wire 47 so that the draw-cord ends may be passed into said loops 45 and 46 without removing the weights from the draw-cord extremities. The separator 47 prevents the end portions of the draw-cords from becoming twisted about each other.

The carriers 15 may, as shown in Fig. 17, be provided with a single opening 49 instead of the pair of perforations 17, this opening 49 having a V-shaped lower wall which will cause a pair of suspension hooks to be maintained in close contact with each other and which also causes a single hook or a pair thereof to become disposed midway between the side edges of the plate 15.

The structure of this invention is very advantageous as the rods and brackets thereof may be sold and used without including any other parts, such as the carriers 15, 27, and 28; the sheave carriers 24 and 25; the drawcord separator 47; or the center supporting bracket etc. In such event the curtains or draperies are provided with hems through which the rod is passed.

On the other hand, the rods may be sold and used with only the plate 7 and its companion clamping element, carriers 15, and clamping means including plates 40. Additional clamping devices including the plates 42 may be added, if desired, and if the purchaser desires the complete draw-cord equipment, the same may be added easily at any time, the entire equipment being such as to meet every requirement at very low cost.

The telescopically extensible rods are very advantageous in that they may be removed from one window casing and extended or contracted in length to fit another as in cases of change of residence of the owner.

The whole equipment affords every desirable element of convenience, efficiency and good appearance at minimum cost to the consumer.

I claim as my invention:

1. The combination with a telescopically extensible curtain rod, of a center supporting bracket terminating at a point proximate to the rear face of the rod, and a member engaged with the overlapping interengaged portions of the rod for securing the latter against relative movement and engaging the said center supporting bracket.

2. The combination with a telescopically extensible curtain rod, of a center supporting bracket having a substantially vertically disposed arm opposed to the inner face of said rod, and a member engaged with the overlapping interengaged portions of the rod for securing the latter against relative movement and engaging the said arm of said bracket.

3. The combination with a curtain rod equipped with traverse carriers, of a center supporting bracket terminating at a point opposed to the inner face of said rod, and a member secured to said rod between its ends and engaging said bracket, said member constituting a stop to limit the movement of said traverse carriers in one direction.

4. The combination with a telescopically extensible curtain rod, of a center supporting bracket terminating at a point proximate to the rear face of the rod, traverse carriers on said rod, and a member engaged with the overlapping interengaged portions of the rod for securing the latter against relative movement and engaging the said center supporting bracket, said member constituting a stop to limit the movement of said carriers.

5. The combination with a hollow, telescopically extensible curtain rod having a continuous slot in its inner face, a center supporting bracket terminating at a point proximate to the rear face of the rod, and a member engaged with the overlapping interengaged portions of the rod bordering said slot for securing the component parts of said rod against relative movement and engaging the rod with the center support.

6. The combination with a hollow, telescopically extensible curtain rod having a continuous slot in its inner face and traverse carriers mounted to travel in said slot, of a clamping device engaging the overlapping portions of the component parts of said rod bordering said slot midway between the ends of the rod, said device constituting a stop to limit the travel of said carriers.

7. The combination with a hollow, telescopically extensible curtain rod having a continuous slot in its inner face and traverse carriers mounted to travel in said slot, of a center supporting bracket having its outer end opposed to the rear wall of the rod, a clamping device engaging the overlapping portions of the component parts of said rod bordering said slot midway between the ends of the rod, said device constituting a stop to limit the travel of said carriers and engaging said bracket.

8. The combination with a telescopically extensible hollow curtain rod having a continuous longitudinal slot in its rear face, and traverse carriers mounted for travel in said slot, of a center supporting bracket having a bifurcated arm disposed in close proximity to the slotted wall of said rod, and a clamping member engaged with the overlapping interengaged portions of the component parts of the rod bordering said slot to prevent relative movement of said component parts, said clamping device including a member engaged with the bifurcated arm of said bracket, said device also constituting a stop to limit travel of said carriers.

9. A telescopically extensible curtain rod, C-shaped in cross-section and presenting a continuous longitudinal slot in its rear wall, a clamping device engaged with the overlapping end portions of the component parts of the rod at points bordering said slot to prevent relative movement of said parts, drapery attaching members secured to the end portions of said rod, and drapery carriers having pivotal and sliding movement relatively to the rod disposed between said clamping and attaching means and equipped externally with formations adapted to prevent said carriers from overlapping each other and to co-operate with said clamping and attaching means to limit travel of said carriers.

10. A curtain fixture comprising a telescopically extensible curtain rod composed of two members, C-shaped in cross-section, a clamp secured to the flanges of the overlapped portions of said members, sheave carriers mounted within the end portions of said members, traverse slides mounted for travel and rotation between said clamp and said sheave carriers, a pair of master carriers disposed between said clamp and first-named carriers, one of said master carriers having a flange underlying the rod and the other thereof having a flange disposed in offset relation to and forwardly of said rod, said respective flanges terminating in fingers each overlapping the other as said master carriers engage said clamp to limit their movement in one direction, a traverse cord trained over the sheaves of said sheave carriers and presenting two strands disposed within the rod, and detachably secured between their ends to said respective master carriers, said clamp constituting a guide stop for said master carriers for adjustment of the points in the draw-cord attached to the latter.

11. A curtain fixture comprising a curtain rod, C-shaped in cross section, a clamp secured to the flanges of said rod midway between its ends, sheave carrying clamps secured to said flanges adjacent the respective ends of the said rod, and equipped with means for securing the outer ends of curtains thereto, a draw-cord trained over the said sheaves, a pair of master carriers traveling on the lower flange of the rod and attached to said draw-cord, intermediate carriers traveling upon the lower flange of the rod between said sheave clamps and said master carriers and rotatable relatively to the rod, said draw-cord disposed within the rod and detachably secured to said respective master carriers, said first-named clamp constituting a stop and guide element for adjustment of the points of attachment of the draw-cord with said master carriers, the latter and said other carriers having opposed side formations to prevent overlapping of one carrier upon another.

12. The combination with a hollow longitudinally slotted curtain rod and a center support therefor disposed between the same and the window casing, of a device secured to the rear slotted wall of the rod for detachably engaging the same with said support, said device leaving the top, bottom, and front walls of said rod unobstructed.

13. The combination with a hollow longitudinally slotted curtain rod and a center support therefor disposed between the same and the window casing and having an upwardly projecting bifurcated arm disposed proximate to said rod, of a clamp secured to the rear slotted wall of the rod and including a nut having an annular groove adapted to engage in the bifurcated arm of said support.

14. The combination with a curtain rod and a center support therefor disposed between the same and the window casing, of a member secured to the wall of the rod opposed to said support for engaging the rod therewith, said member leaving the top, bottom, and front walls of the rod unobstructed.

In testimony whereof, I have hereunto set my hand this 29th day of May, 1931.

CHARLES W. KIRSCH.